United States Patent [19]

Hayashi et al.

[11] Patent Number: 4,776,497

[45] Date of Patent: Oct. 11, 1988

[54] APPARATUS FOR QUANTITATIVELY EXTRUDING FOOD MATERIAL

[75] Inventors: Torahiko Hayashi; Yasunori Tashiro, both of Utsunomiya, Japan

[73] Assignee: Rheon Automatic Machiner Co., Ltd., Utsunomiya, Japan

[21] Appl. No.: 910,460

[22] Filed: Sep. 23, 1986

[30] Foreign Application Priority Data

Oct. 2, 1985 [JP] Japan ............................... 60-219444

[51] Int. Cl.[4] ............................................... A23G 9/28

[52] U.S. Cl. .................................... 222/235; 425/145; 425/204; 425/209; 425/449; 426/283

[58] Field of Search ............... 425/145, 147, 200, 201, 425/202, 204, 209, 221, 222, 227, 238, 239, 256, 260, 298, 447, 448, 449, 376 R; 426/513, 516, 517, 518, 283; 366/97–100, 72, 77, 76; 264/323; 17/32–35, 41, 42, 49; 53/517; 222/235, 233

[56] References Cited

U.S. PATENT DOCUMENTS

| | | | |
|---|---|---|---|
| 329,376 | 10/1885 | Dumoulin | 366/100 |
| 2,012,682 | 8/1935 | Johnson | 425/239 |
| 2,485,595 | 10/1949 | Hammann | 425/448 |
| 3,101,761 | 8/1963 | Buehler et al. | 53/517 |
| 3,733,653 | 5/1973 | Javaloy et al. | 17/35 |
| 3,826,411 | 7/1974 | Kalns | 222/235 |
| 4,669,967 | 6/1987 | Hayashi et al. | 425/376 R |

FOREIGN PATENT DOCUMENTS

| | | | |
|---|---|---|---|
| 296937 | 9/1927 | Fed. Rep. of Germany | 425/239 |
| 2408063 | 9/1975 | Fed. Rep. of Germany | 425/447 |

*Primary Examiner*—Jan H. Silbaugh

*Assistant Examiner*—Jill L. Fortenberry

*Attorney, Agent, or Firm*—Finnegan, Henderson, Farabow, Garrett and Dunner

[57] ABSTRACT

An apparatus for quantitatively extruding food material is provided. At least one introducing means such as a driven roller having a vane adapted to protrude from it propels the food material into a cylindrical food forming device, which comprises a longitudinal groove and a cylinder having a rectangular opening on a side thereof and encloses the food material for a piston to extrude it from the apparatus.

6 Claims, 5 Drawing Sheets

APPARATUS FOR QUANTITATIVELY EXTRUDING FOOD MATERIAL

BACKGROUND OF THE INVENTION

1. Field of the Invention

The present invention relates to an apparatus for quantitatively extruding food material, and more particularly to an apparatus for quantitatively extruding a mixture of food materials, as for example, a vegetable salad or a fruit salad, which are mixtures of pieces of vegetables, fruit and/or meat that is not uniform in shape, and a dressing, into a bread, such as a croissant.

2. Description of Prior Art

Japanese Patent Publication No. 39-21968 discloses an apparatus for quantitatively extruding paste material, in which two opposed rollers, each provided with a plurality of arcuate recesses on the peripheries thereof, are rotated step by step, each pair of opposing recesses forming at each step a cylindrical space, whereby the paste material is enclosed in the space, and is then extruded by a piston.

In this apparatus the rollers can be rotated only after the piston is withdrawn, and moreover, it is necessary to introduce air into the temporarily formed cylindrical space to avoid vacuum and to enable the piston to be smoothly retracted therefrom.

Along with the rotation of the rollers, the introduced air is brought into the hopper and is increasingly enclosed together with the food material in the cylindrical space, which leads to inaccurate measurements of the food material.

SUMMARY OF THE INVENTION

It is an object of this invention to provide an apparatus for quantitatively extruding food material.

It is another object of the invention to provide an apparatus for quantitatively extruding a mixture of food materials such as a vegetable salad, a fruit salad, or paste materials containing liquid and solid food materials.

It is a further object of the invention to provide an apparatus for enclosing a desired amount of food material without allowing air to be introduced into the material.

It is a still further object of the invention to provide an apparatus for enclosing the food material while decreasing the destruction of the fibrous tissue of the vegetable and/or fruit in the mixture, or without separating the juice from the vegetables and/or fruits.

In one aspect of the invention, an apparatus for quantitatively extruding food material comprising a hopper having therein a chamber communicating with a first port and a second port for the chamber, the first and second ports being disposed oppositely of each other on the hopper, a piston mounted to the first port, and a nozzle mounted on the second port, characterized by at least one introducing means disposed in the hopper, means for driving the introducing means, a cylindrical food forming device comprising on the bottom surface of the hopper a longitudinal groove of a semicircular shape in cross-section and a cylinder with front and rear end openings and adapted to revolve slidably within the groove and provided with a rectangular opening at a side thereof having a width approximately equal to the diameter of the cylinder and a length approximately equal to the length of the bottom of the hopper, leaving a semicircular wall, means to revolve the cylinder to form a cylindrical space surrounded by the semicircular wall of the cylinder and said groove, with front and rear end openings, or to juxtapose the semicircular wall of the cylinder with the groove to form a cavity to receive the food material, the front and rear end openings of the cylindrical space communicating with the first and second ports, respectively, and means for advancing the piston from the first port into the cylindrical space to extrude the food material contained therein and retracting to allow the food material to enter said cavity.

Since in this invention, there is no need for a valve mechanism or piston and cylinder assembly for vacuum suction, even food material containing large-sized solids can be extruded.

In this invention, a cylindrical food forming device and at least one introducing means is provided in a hopper. The cylindrical food forming device receives the food material and encloses it, and thereafter the material is extruded by a piston. As the cylindrical food forming device is mounted on the bottom surface of the hopper, means for introducing the food material may be provided above the cylindrical food forming device, but the position is not limited so long as food material can be introduced into the cylindrical food forming device. For this purpose various devices can be used so long as they can introduce the material, for instance, a roller provided with vanes for propelling the material, a screw feeder, means for agitating the material in which vanes, propellers, rods, or plates are rotatably mounted on a shaft movable by a motor, and a propelling device using an air compressor. Accordingly, in the invention, the introducing means is meant as any device which functions to introduce the material in the hopper into the bottom or in the vicinity thereof.

Also, in this invention, driven rollers and a piston are used to propel food material into the cylindrical space. However, since the members forming a cylindrical space are separated from and move independently of the driven rollers, the piston, after extruding the material, can be retracted while or even after the cylindrical space is opened, whereby the material to be extruded at the next stroke enters the cylindrical space without any accompanying air.

DESCRIPTION OF THE PREFERRED EMBODIMENTS

Figure 1:
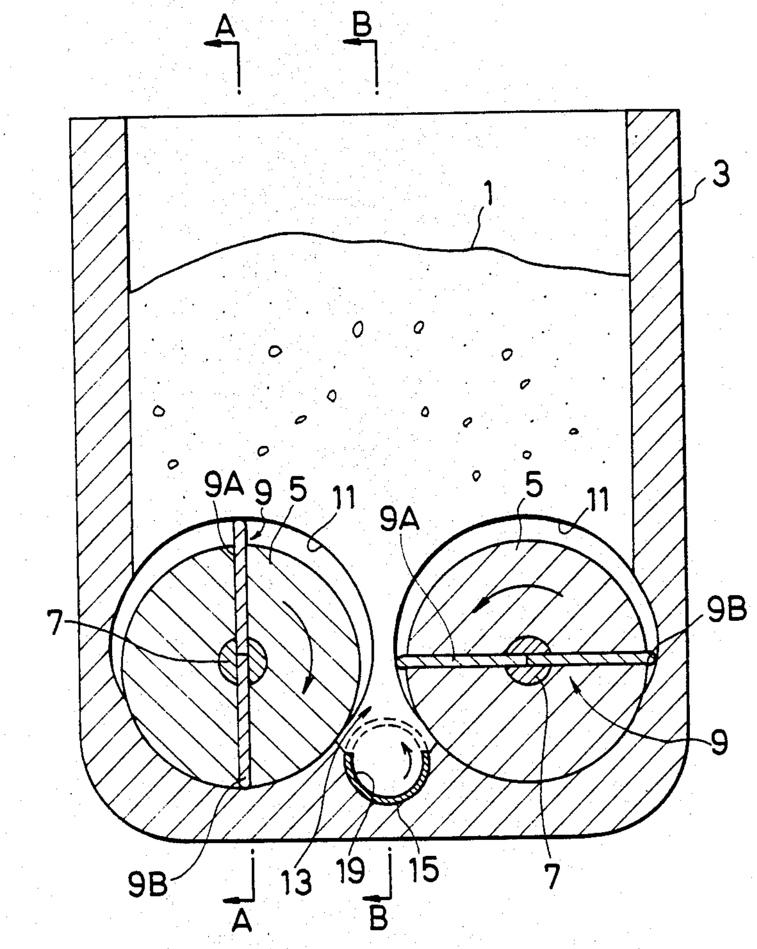
FIG. 1 shows a schematic front elevational view in cross-section of a first embodiment of the invention.

An embodiment of the invention will now be described with reference to FIGS. 1 and 2.

A hopper 3 is mounted on a housing 2 which accommodates related devices. Two driven rollers 5 are arranged horizontally at the lower portion of the hopper 3. A rectangular vane 9 is made from two stamped plates 9A, 9B.

Figure 2:
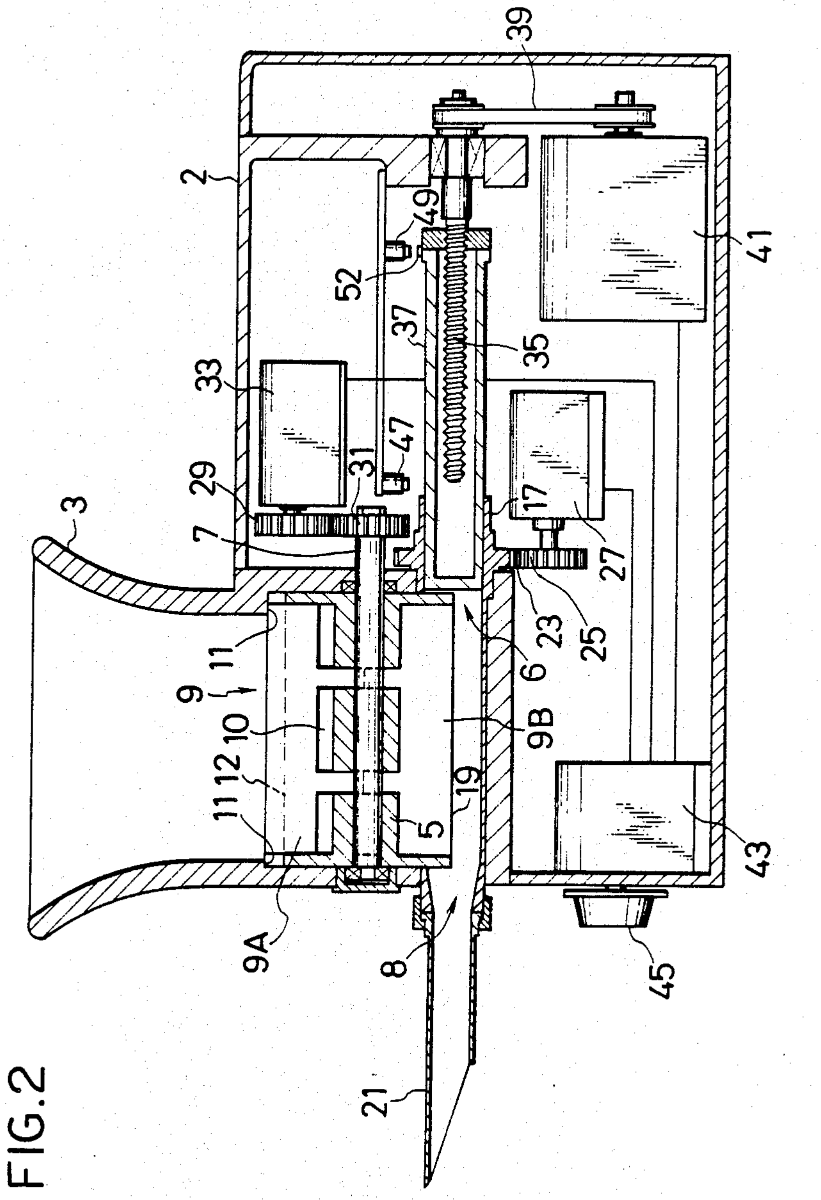
FIG. 2 shows a schematic side elevational view in partial cross-section of an apparatus of the first embodiment of the invention. The cross-section of the hopper and one of the driven rollers, a vane in the roller and a shaft of the roller are illustrated taken on the A—A line of FIG. 1, and the cross-section of a nozzle, a longitudinal groove, a piston, and a threaded rod and a piston are illustrated taken on the B—B line of FIG. 1.

As shown in FIG. 2, each of the stamped plated 9A, 9B is so shaped that two relatively smaller rectangular protrusions are formed perpendicularly to one longitudinal side thereof spaced apart from each other. The stamped plate 9A is connected to its mating plate 9B, at the ends of the protrusions to form the vane 9, and the vane 9 is placed in two slots provided in the shaft 7 and in the driven rollers 5. The vane 9 is slidably received in a slot 10, extending longitudinally of the roller 5 and diametrically across the circular cross-section thereof.

The rollers 5 are spaced apart from and parallel to each other and the side wall of the hopper 3, thereby forming a longitudinal space 13.

Each roller is mounted on a shaft 7, and a slot 10 is formed through the roller and the shaft to receive the vane 9 slidably. A dotted line 12 indicates the periphery of the roller 5 behind the vane 9. On the front and rear walls of the hopper 3, guides 11 are formed to provide cam surfaces to push one end of the vane 9, to thereby protrude the opposed end of the vane 9. A gear 31 is mounted on the shaft 7 near the rear end thereof.

A motor 33 is disposed in the housing 2, and its rotative force is transmitted through a gear 29 mounted on the shaft of the motor 33 and a gear 31 mounted on the shaft 7 of one of the driven rollers 5. The rotative force of the motor 33 is also transmitted through the gear 29, a gear (not shown) meshing with the gear 29, and a gear (not shown) meshing with the aforesaid gear and mounted on the shaft 7 of the other driven roller 5 (shown in FIG. 1). Thus the rollers 5 can be rotated in opposite directions, the roller on the right side in FIG. 1 rotating counterclockwise, while the other rotating clockwise, while sliding on portions of the wall of the hopper 3. When each of the rollers 5 rotates, each of the vanes 9 protrudes or retracts by a guide 11 provided on the side walls of the hopper 3, whereby the vanes 9 propel the material 1 in the hopper 3 into a lower portion. A cylindrical food forming device comprises a longitudinal groove 15 and a cylinder 17. The longitudinal groove is provided in the longitudinal space between the two rollers and on the bottom surface of the hopper 3. The groove 15 is of a semicircular shape in a cross-section and communicates with first and second ports 6 and 8, which are disposed oppositely of each other on the hopper 3. A nozzle 21 is mounted on the second port 8.

A cylinder 17, having a length approximately equal to that of the groove 15, is arranged so as to slidably revolve within the groove 15. The cylinder 17 has an opening at the rear end thereof, on the periphery of which end a gear 23 is mounted. The cylinder 17 also has an opening at its front end, which connects with the second port 8. The cylinder 17 has on one side thereof a rectangular opening of a width approximately equal to the diameter of the cylinder and a length approximately equal to the length of the driven roller 5, leaving a semicircular wall 19. The cylinder 17 can be rotated by a motor 27 disposed in the housing 2, through a gear 25 mounted on the shaft of the motor 27 and meshing with the gear 23.

When the semicircular wall 19 is juxtaposed with and lies on the groove 15 face-to-face, the rectangular opening is directed upward, namely, a cavity to receive the food material is formed. On the contrary, when the cylinder 17 revolves at a degree of about 180° the semicircular wall 19 and the groove 15 form a closed cylindrical space which communicates with the front and rear ports 6 and 8.

A piston 37 is of a cylindrical form and adapted to advance and retract through the cylinder 17, by means of a female screw provided at one end of the piston 37 and a threaded rod 35 meshing with the female screw and rotatably mounted on a frame of the housing 2. The rod 35 is rotated through a belt 39 by a motor 41 disposed in the housing 2. When the motor 41 is energized in the normal or reverse direction of rotation, the piston 37 advances or retracts within the cylinder 17, and within the cylindrical space.

Magnetic proximity switches 47 and 49 suspend from a horizontal rail provided on a portion of the housing 2, parallel to the piston 37, and are adapted to change their mounting positions along the horizontal rail. These switches 47 and 49 sense the approach of a magnetic member 52 attached to the upper surface of the rear end of the piston 37, and transmit signals informing the approach of the magnetic member 52 to a control unit 43 provided in the housing 2. The unit, then, transmits a signal to the motor 41 to stop it. The switch 47 is used to stop the forward movement of the piston 37, and the switch 49 is to stop the rearward movement of the piston. By changing the positions of the switches 47 and/or 49, the amount of the material 1 to be extruded is determined.

The piston 37 is adapted to advance when the semicircular wall 19 and the groove 15 from the closed cylindrical space, and to retract while the cylinder 17 is rotated to open the cylindrical space. The relationship between the forward and backward movements of the piston 37 and the start and stop of its movement, and the revolution of the cylinder 17 are programmed in the control unit 43. The start and stop of the operation of the motors 27 and 41 are controlled by turning a knob 45. Also, a timer (not shown) to control the rotation of the motor 33 can be provided in the control unit, if necessary, and, in such case, the control of the motor 33 can be made by turning the knob 45. The motor 33 may be rotated to drive the driven rollers 5 independently of the movement of the cylinder 17, but the rotation of the motor 33 and the movement of the cylinder 17 can be advantageously related to each other. For instance, the driven roller 5 may be rotated 180°, 120°, or 90° while the cylinder 17 is rotated 360°. The relationship between the rotation of the driven roller 5 and the movement of the cylinder 17 is also programmed in the control unit 43.

The control of the rotation of the driven roller 5 can also be possible by means of a plurality of magnetic members (not shown) attached at intervals to the side of the gear 31 along its circumference and a proximity switch (not shown) mounted, adjacent the gear 31, on the housing 2, whereby the proximity switch is adapted to emit signals to stop the motor 33.

The operation of the first embodiment of the invention will now be described. First, the knob 45 may be turned to select a desired condition to operate the apparatus. The food material 1 is then charged in the hopper 3 and accumulates over the driven rollers 5.

The rheological characteristic of the food materials to be treated with the apparatus varies. For instance, the elasticity of a salad varies greatly depending on the elasticity of vegetables mixed into it. Therefore, if the amount of the food material to be placed in the cylindrical space is adjusted according to the elasticity of the material, the food material can be more precisely measured and the quality of the product is improved. Therefore, it is advisable to change the rotation angle of the driven rollers 5 for every cycle of the formation of the closed cylindrical space, leading to the intermittent rotation of the driven rollers 5.

The operator can also select, by turning the knob, a desired condition to operate the piston 37, such as whether the piston 37 begins to retract from its most advance position when the rectangular opening begins to appear or when the opening has completely formed.

The accumulated food material is then introduced into the longitudinal space 13, while the driven rollers 5 rotate and the vanes 9 are made to protrude from the rollers 5 by the cams 11 which push the vanes 9. The vanes 9 propel the food material into the inside of the semicircular wall 19. After the food material fills the semicircular wall 19 and in the proximity thereof, the cylinder 17 is rotated to close the cylindrical space between the semicircular wall 19 and the longitudinal groove 15.

Vegetables and/or fruit parts overflowing the cylindrical space are cut away by the closing edge of the semicircular wall 19.

When the food material 1 is completely enclosed in the closed cylindrical space, the piston 37 extrudes the material. When the magnetic proximity switch 47 senses the magnetic member 52, it transmits a signal to inform the control unit 43 of the approach of the magnetic member 52, and the control unit 43 transmits a signal to stop the motor 41.

After the piston 37 extrudes the food material, the semicircular wall 19 begins to return to an open position at which the rectangular opening of the cylinder 17 is directed upward. The piston 37 can begin to be retracted at the beginning of the returning of the semicircular wall 19 to the open position, or may be retracted after the cylindrical space has completely opened.

Figure 3:
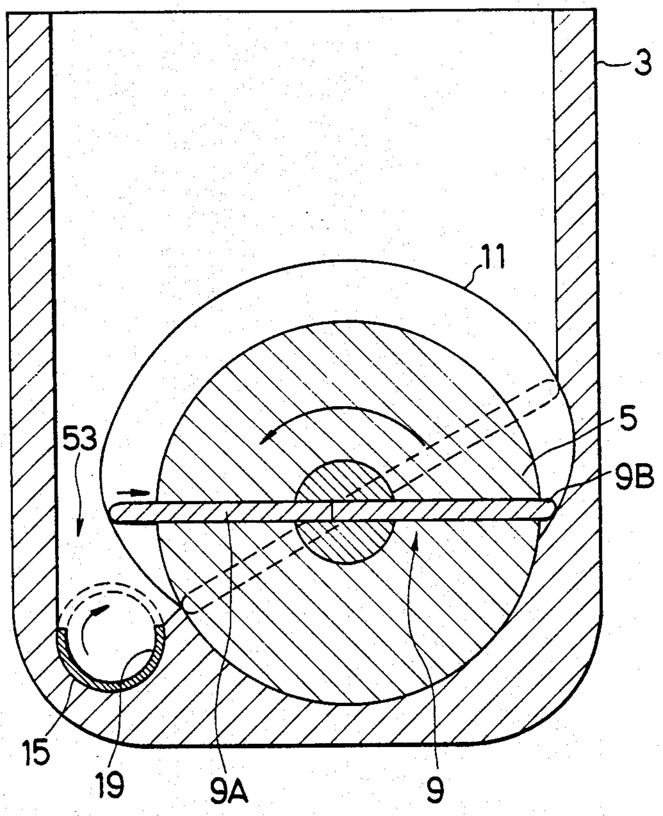
FIG. 3 shows a schematic front elevational view in cross-section of a second embodiment of the invention.

In a second embodiment of the invention, as known in FIG. 3, a single driven roller 5 is provided. One side of the roller 5 is spaced apart from and parallel to a side wall of the hopper 3 to form a longitudinal space 53, in which the cylindrical forming device comprising the longitudinal groove 15 and the semicircular wall 19 is provided. The roller 5 is arranged to rotate counterclockwise in FIG. 3 as indicated by an arrow. A vane 9 longer than the diameter of the roller 5 is inserted in a through hole formed in the roller 5 and made to engage a cam 11 formed on each of the front and rear end walls of the hopper 3. The cam 11 is configured so that an end of the vane 9 protrudes to propel the food material into the longitudinal space 53.

Also, the semicircular wall 19 is adapted to turn and to form a closed cylindrical space, enclosing the charged food material 1, which is then extruded by a piston in a manner similar to that of the first embodiment.

Figure 4:
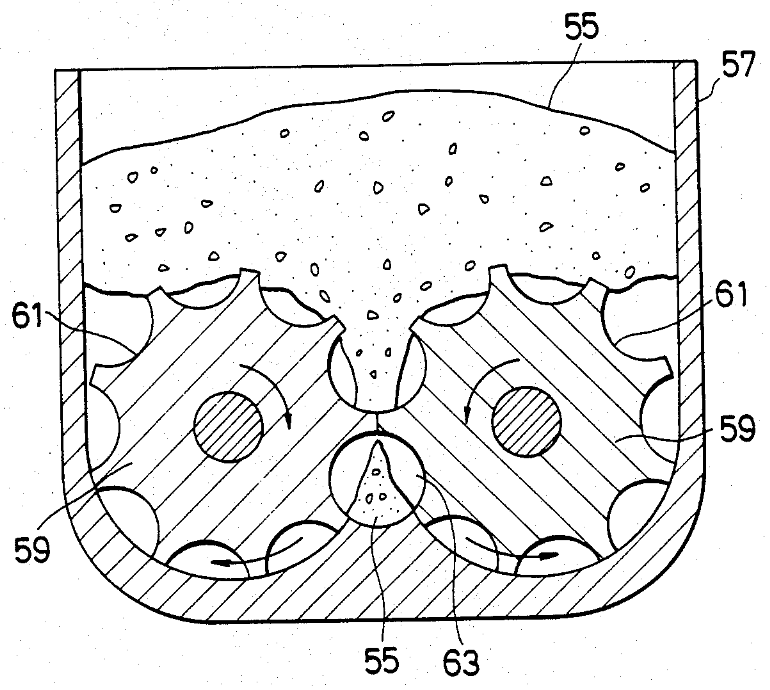
FIG. 4 shows a schematic front elevational view in cross-section of the apparatus of a prior art apparatus.
Figure 5:
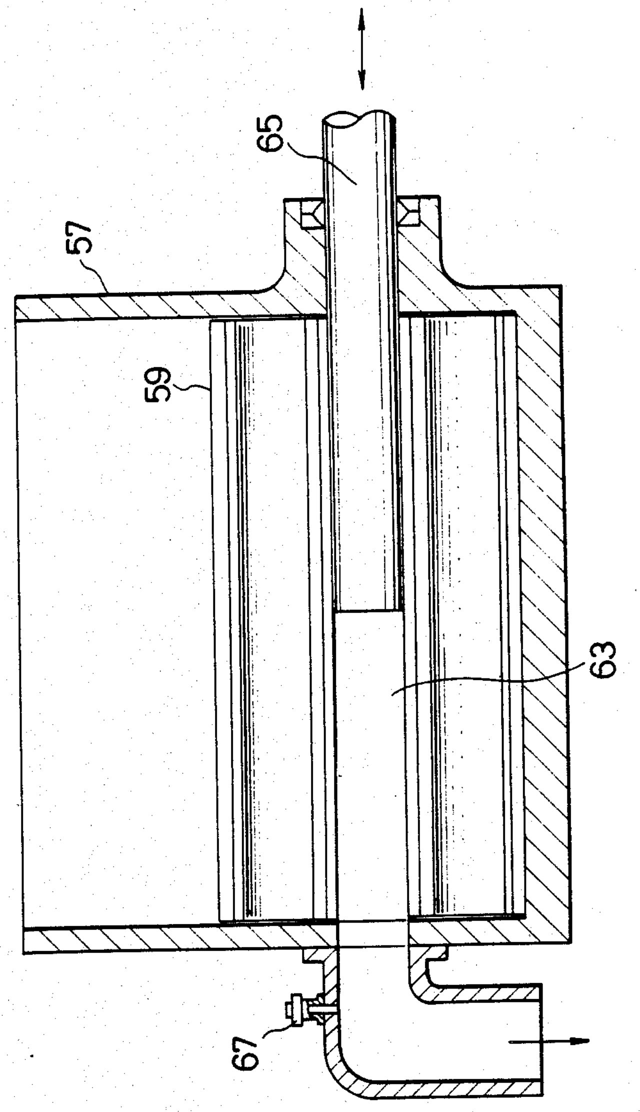
FIG. 5 shows a schematic side elevational view of the apparatus of the prior art apparatus.

In FIGS. 4 and 5, a prior art extruder is shown, in which two rollers 59 are arranged in a hopper 57 parallel to each other and adapted to rotate step by step in opposite directions as indicated by arrows described in FIG. 4. Each roller 59 is provided, on the periphery thereof, with a plurality of arcuate recesses 61, and a pair of opposed recesses are synchronized to form a temporary closed cylindrical space 63 in cooperation with a portion of the bottom wall. The piston 65 is adapted to advance into the space 63 to extrude the food material inside the space 63 and then retract. During this cycle of the piston 65, the rollers 59, 59 stand still. After confirming the complete withdrawal of the piston 65 would the rollers start to rotate. As will be understood from FIG. 4, paste material 55 cannot fill the space 63, and the piston 65 extrudes air as well as the material 55, which results in an inaccurate measurement of the material.

Air is introduced from a valve 67 to avoid creating a vacuum in the cylindrical space 63, which might be caused by the piston 65 being retracted while the cylindrical space remains closed.

Air thus introduced in the space 63 remains in the vicinity of the arcuate recesses 61, even after the space 63 is open when the rollers 59 are rotated, and a portion of air ascends, and the remainder is carried to the upper portion of the rollers 59 by the arcuate recesses along with the rotation of the roller 59, as shown in FIG. 4.

Therefore, air around the rollers is in turn enclosed in the cylindrical space 63 together with the paste material 55.

To the contrary, in the apparatus according to the invention, the piston 37 can be retracted after the cylindrical space is opened, or while the cylinder 17 rotates to open the cylindrical space. As a result, no air is required to be introduced into the cylindrical space. Rather, the food material 1 can be introduced into the cylindrical space, even when the piston 37 is being retracted.

As aforesaid, since air is not mixed into the food material enclosed in the cylindrical space, accurate measurement of the food material can be accomplished by the apparatus of the invention.

Other characteristic features of the invention are as follows:

Since an assembly comprising a valve or a piston and cylinder assembly for sucking food material is not necessary for measuring the food material in the invention, any food material containing large solids can be quantitatively extruded.

By selecting the condition of rotation of the motor 33, for example, successive rotation or intermittent rotation, the amount of the food material to be enclosed in the closed cylindrical space can be controlled in response to the elasticity of the food material deriving from the elastic characteristic of vegetables to be contained therein.

And, since the apparatus of the invention need not use a strong agitator to propel the food material into the cylindrical space, the food material can be extruded without destroying the fibrous tissue of the vegetable and/or fruit in the mixture, or without separating the juice from the vegetables and/or fruits.

We claim:

1. An apparatus for quantitatively extruding food materials, including solids such as fruits and vegetables, comprising:

- a hopper having therein a chamber communicating with a first port and a second port for the chamber, the first and second ports being disposed oppositely of each other on the hopper;
- a piston mounted on the first port;
- an elongated nozzle, mounted on the second port, for insertion into a bread product;
- introducing means having at least one roller with at least one protruding vane, the roller being mounted on a shaft and disposed horizontally across a portion of the chamber and providing a path along which the food materials downwardly progress, the protruding vane being received slidably in at least one slot extending longitudinally of the roller and diametrically through the circular cross-section of the roller and shaft;

means for rotating the roller;

means to control the rotation of the roller depending on the type of food materials;

a cylindrical food forming device, disposed with its longitudinal axis parallel to a longitudinal axis of said roller and disposed on a bottom surface of said chamber, comprising a longitudinal groove of a semicircular shape in cross-section and a cylinder with front and rear end openings and adapted to rotate slidably within the groove and provided with a long rectangular opening at a side thereof having a width approximately equal to the diameter of the cylinder and a length approximately equal to the length of the bottom of the hopper;

means to rotate the cylinder to form a cylindrical space surrounded by the semicircular wall of the cylinder and said groove, with front and rear end openings, communicating with the second and first ports, respectively; and means for advancing the piston from the first port into the cylindrical space to extrude the food material contained therein and retracting the piston to allow the food material to enter said cylindrical space.

2. The apparatus of claim 1, wherein one side of said roller is spaced apart from and said longitudinal axis of said roller is parallel to a substantially planer side wall of the chamber for forming a longitudinal space through which the solid food material can pass substantially intact.

3. The apparatus of claim 1, wherein said at least one roller includes two rollers spaced apart from and parallel to each other for forming a longitudinal space through which the solid food material can pass substantially intact and wherein said longitudinal axis of said cylindrical food forming device is equidistant from said longitudinal axis of each of said rollers.

4. The apparatus of claim 1, wherein said means for rotating the roller comprises means for controlling a rotation angle of the roller depending on the type of material.

5. The apparatus of claim 3, wherein said means for rotating the roller comprises means for rotating the two rollers at different phases.

6. The apparatus of claim 1, wherein the cylindrical space has a diameter, the nozzle has an inner diameter, and the diameter of the cylindrical space is substantially equal to the inner diameter of the nozzle.

* * * * *